(12) United States Patent
Kasama et al.

(10) Patent No.: US 6,689,545 B2
(45) Date of Patent: Feb. 10, 2004

(54) METHOD OF FABRICATING NEAR-FIELD LIGHT-GENERATING ELEMENT

(75) Inventors: Nobuyuki Kasama, Chiba (JP); Manabu Oumi, Chiba (JP); Yasuyuki Mitsuoka, Chiba (JP); Kenji Kato, Chiba (JP); Hidetaka Maeda, Chiba (JP); Takashi Niwa, Chiba (JP); Yoko Shinohara, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/195,340

(22) Filed: Jul. 15, 2002

(65) Prior Publication Data

US 2003/0011722 A1 Jan. 16, 2003

(30) Foreign Application Priority Data

Jul. 16, 2001 (JP) ........................................ 2001-214732

(51) Int. Cl.[7] ................................................. G03F 7/00
(52) U.S. Cl. ..................................... 430/321; 250/493.1
(58) Field of Search ....................... 430/321; 250/493.1, 250/503.1

(56) References Cited

U.S. PATENT DOCUMENTS

2001/0004348 A1 * 6/2001 Ueyanagi .................... 369/118
2003/0066944 A1 * 4/2003 Matsumoto et al. ..... 250/201.3

FOREIGN PATENT DOCUMENTS

JP          2002-174585 A  *  6/2002

* cited by examiner

Primary Examiner—John A. McPherson
(74) Attorney, Agent, or Firm—Adams & Wilks (57) ABSTRACT

A method of fabricating a near-field light-generating element having a minute scattering body inside an aperture, the scattering body producing plasmons by being illuminated with light, includes a step of forming minute scattering bodies periodically arranged on a substrate, a step of selecting the periodically arranged minute scattering bodies except for only one minute scattering body, and a step of forming the aperture such that the single minute scattering body is placed inside the aperture.

14 Claims, 7 Drawing Sheets

METHOD OF FABRICATING NEAR-FIELD LIGHT-GENERATING ELEMENT

BACKGROUND OF THE INVENTION

1. Field of the Invention

The present invention relates to a method of fabricating a near-field light-generating element for shining or detecting near-field light used in a near-field optical microscope or near-field optical memory device and, more particularly, to a method of fabricating a near-field light-generating element having a minute scattering body inside an aperture.

2. Description of the Related Art

Scanning probe microscopes (SPMs) typified by scanning tunneling microscopes (STMs) and atomic force microscopes (AFMs) are used to observe microscopic regions on the nanometer order on sample surfaces. In SPM, a probe having a sharpened tip is scanned across a sample surface. An interaction such as a tunneling current or atomic force produced between the probe and the sample surface is taken as a subject to be observed. An image of a resolution dependent on the topography of the probe tip can be obtained. However, relatively strict limitations are imposed on observed samples.

Accordingly, a scanning near-field optical microscope (SNOM) attracts attention today. The microscope takes an interaction produced between near-field light produced at the tip of a probe and a sample surface as a subject to be observed to thereby permit observation of microscopic regions on the sample surface.

In SNOM, near-field light is shone onto a sample surface from an aperture formed at a sharpened tip of optical fiber. The aperture has a size of less than the diffraction limit of the wavelength of light introduced into the optical fiber. For example, it has a diameter of about 100 nm. The distance between the aperture formed at the tip of the probe and the sample is controlled by SPM techniques. The value is less than the size of the aperture. At this time, the spot diameter of the near-field light on the sample is almost equal to the size of the aperture. Therefore, optical properties of a sample in a microscopic region can be observed by scanning the near-field light impinging on the sample surface.

Such a near-field light-generating element can be applied as a high-density optical memory device which creates near-field light of high energy density in the aperture portion of a probe by introducing light of relatively large intensity toward the sample through the probe and locally modifying the structure or physical property on a recording medium surface by the near-field light. The optical memory device can also be used as a microscope. Attempts have been made to increase the angle at the tip of the probe in order to obtain near-field light of large intensity. Furthermore, in applications of such a memory device, some devices where a probe having an aperture in a flat substrate unlike a sharpened probe is used as a record/read head have been devised.

In these elements making use of near-field light, formation of an aperture is important. As one method of forming the aperture, a method disclosed in patent publication No. 21201/1993 is known. In the method of forming an aperture of patent publication No. 21201/1993, a sharpened optical waveguide on which a light-shielding film is deposited is used as a sample for forming an aperture. The method of forming the aperture consists of pressing the sharpened optical waveguide having the light-shielding film thereon against a hard flat board with a quite small amount of push that is controlled well by a piezoelectric actuator to thereby plastically deform the light-shielding film at the tip.

Another method of forming an aperture is disclosed in patent laid-open No. 265520/1999. In the method of forming an aperture in patent laid-open No. 265520/1999, the subject in which an aperture is formed is the tip of a protrusion formed on a flat board or plate by a focused ion beam (FIB). The method of forming the aperture is carried out by directing an FIB onto a light-shielding film at the tip of the protrusion from a side and removing the light-shielding film at the tip of the protrusion.

In addition, in order to improve the resolution and to increase the intensity of scattering light produced as a result of an interaction created between the probe and the sample, a method making use of a phenomenon where fine metal particles are made to produce plasmons by incident light has been proposed.

Okamoto et al. have proposed a probe having fine particles of a metal such as Au (gold) or Pt (platinum) fixed at the tip of a probe body that is made of a transparent material such as SiN (silicon nitride) and is a sharp, tapering member (Takayuki Okamoto and Ichirou Yamaguchi, "Near-field scanning optical microscope using a gold particle", *Jpn. J. Appl. Phys.* 36, L166 (1997)).

In such a probe where the metal fine particles are fixed at the tip of a sharpened probe body made of a transparent material, the metal fine particles are made to produce plasmons by incident light. The scattering efficiency is higher compared with the prior art probe having no metal fine particles. A larger amount of detected light can be obtained. Since the resolution is determined by the position at which metal fine particles are fixed at the tip, the radius of curvature, the kind of the metal fine particles, and so on. Therefore, a higher resolution can be derived by fixing appropriate fine metal particles to the tip of a probe.

Furthermore, according to the optical fiber probe and method of fabricating same as disclosed in U.S. Pat. No. 3,117,667, a protruding portion of a core protruding from a clad is formed at one end of optical fiber. A metal film is formed on the surface of the protruding portion except for the front-end portion. The outer portion of the protruding portion is made to recede from the front-end surface. A metal sphere is formed at the tip of the inner portion. Therefore, an optical fiber probe can be obtained which can detect near field at high sensitivity and high resolution without being affected by scattering light scattered by the base portion of the probe or by scattering light due to the surface roughness of the sample.

In addition, according to the method of creating metal fine particles at the tip of a member, fixing the particles, apparatus therefor, and probe disclosed in patent laid-open No. 2001-83069, a method of forming a metal sphere at the tip of a probe by immersing a sharp member in a metal solution and deoxidizing ions by near-field light, a probe, and apparatus are provided.

Generally, narrowing the aperture lowers the intensity of near-field light produced near the aperture. Where this is scattered or modulated by a sample (or recording medium), the intensity of modulated and propagating light reaching the detector drops. In order to compensate for this, even if the gain of the detection system is increased, the signal-to-noise ratio (S/N) rather deteriorates considerably because of dark current intrinsic to the detector and thermal noise in the amplifier circuit. Of course, increase in the power of laser light introduced into the aperture portion and decrease in the optical spot of laser focused in the aperture portion are advantageous.

However, as the aperture is reduced in size, the thickness of the light-shielding film is urged to be reduced because of restrictions on the micromachining using an FIB or the like and by the effects of attenuation of the introduced light dependent heavily on the ratio between the in-plane dimensions of the aperture and the thickness. Therefore, thinning of the light-shielding film deteriorates the light shielding and increases the dc light component reaching the optical detector. If comparable optical intensity modulation is obtained due to the sample (or recording medium), equivalent signal quality deterioration results. Also, where light is collected using a lens near the aperture portion, the geometrical optics is fundamentally based on the prior art geometrical optics. Consequently, it is impossible to shine light onto the vicinities of the aperture portion at a sufficiently high energy density due to the diffraction limit.

Accordingly, with the conventional method, it is quite difficult to achieve improvement of the reproduced resolution and higher S/N of the signal obtained from the optical detector simultaneously. There is the problem that it is difficult to increase the recording (reading) density.

As a countermeasure against it, in inventions disclosed by Okamoto et al. in U.S. Pat. No. 3,117,667 and patent laid-open No. 2001-83069, a metal fine particle for producing plasmons is formed at the tip of a sharpened probe.

Although such probes are capable of improving the resolution and increasing the light intensity and the S/N obtained with a detector, these probe shapes are not adapted for mass production. Expensive fabrication equipment is necessary to fabricate near-field light-generating elements. There is the problem that it is difficult to reduce the costs of SNOM devices and optical memory devices.

SUMMARY OF THE INVENTION

It is an aspect of the present invention to provide near-field light-generating elements which produce sufficiently large read signal intensity and S/N, ultrahigh density, ultrahigh resolution but can be mass-produced at a low cost.

Accordingly, in order to solve the foregoing problems, a method of fabricating a first near-field light-generating element according to the present invention is adapted to fabricate a near-field light-generating element having a minute scattering body inside an aperture, the scattering body producing plasmons by being illuminated with light, said method comprising the steps of: forming minute scattering bodies placed periodically on a substrate; selecting only one of the minute scattering bodies placed periodically and removing the other minute scattering bodies; and forming said aperture such that said one minute scattering body is placed inside said aperture.

This invention makes it easy to fabricate a near-field light-generating element having a minute scattering body for producing plasmons inside an aperture. The fabrication process for the near-field light-generating element according to the invention itself can be effected in a semiconductor process. High-performance near-field light-generating elements making use of plasmons can be mass-produced. In addition, the cost can be reduced easily. Moreover, similar semiconductor processes can be used as processes for fabricating shapes of near-field light-generating elements other than the aperture portion necessary to apply the present near-field light-generating elements to near-field optical microscopes or optical memory devices. Therefore, the process compatibility between the aperture formation step and the step for forming shapes of other portions is very high.

Furthermore, the efficiency of utilization of light can be immensely enhanced by using a near-field light-generating element fabricated by the fabrication method according to the invention and producing plasmons in a microscope or optical information record/read device. The power consumption can be reduced. The device can be miniaturized.

A method of fabricating a second near-field light-generating element according to the present invention is characterized in that said step of selecting said minute scattering body includes the steps of: forming a resist film so as to cover at least said minute scattering bodies placed periodically; exposing and developing said resist film; and leaving said one minute scattering body and removing the other minute scattering bodies, using a resist-protecting portion formed by said step of exposing and developing said resist.

According to this invention, the advantages of the method of fabricating the first near-field light-generating element according to the invention can be had. In addition, any special and expensive superaccurate positioning mechanism is not necessary in selecting one out of plural minute scattering bodies. Fabrication equipment used in normal semiconductor processes can be used. Furthermore, if the region in which the periodical plural minute scattering bodies are fabricated is widened, near-field light-generating elements can be fabricated with fabrication equipment having no accurate positioning mechanism. Hence, the cost of the near-field optical head can be reduced further.

A method of fabricating a third near-field light-generating element according to the present invention is characterized in that said step of forming the aperture includes the steps of: forming a light-shielding film on the side of said substrate on which said minute scattering body is formed; and forming the aperture by removing said resist-protecting portion.

According to this invention, the advantages of the method of fabricating the first and second near-field light-generating elements according to the invention can be had. In addition, it is not necessary to form a mask for forming an aperture or to form an aperture by FIB processing, since the resist-protecting portion can be used intact as a mask for forming an aperture. Furthermore, a minute scattering body can be always formed within the aperture without the need to perform a strict alignment or complex fabrication processes. In consequence, the cost of the near-field light-generating element can be reduced further.

A method of fabricating a fourth near-field light-generating element according to the present invention is characterized in that said step of forming the aperture includes the steps of: processing said substrate by thinning parts of said substrate using said resist-protecting portion; forming a light-shielding film on the side of said substrate on which said minute scattering body is formed; and forming the aperture by removing said resist-protecting portion.

According to this invention, the advantages of the method of fabricating the first through third near-field light-generating elements according to the invention can be had. In addition, it is possible to etch the substrate without the need to specially form a mask for etching the substrate. Therefore, near-field light-generating elements can be fabricated at lower cost. Since the light-shielding film and the minute scattering body are equal in height, the distance between the sample and the minute scattering body can be reduced. The intensity of scattering light produced as a result of interaction between the sample surface and the minute scattering body can be increased greatly. This further enhances the efficiency of utilization of light. Additionally, the distance between the sample and the minute scattering body is made quite small, improving the resolution.

A method of fabricating a fifth near-field light-generating element according to the present invention is characterized in that the size of said resist-protecting portion is in excess of the size of said minute scattering body and smaller than the sum of the size of said minute scattering body and the pitch of said minute scattering bodies placed periodically.

According to this invention, the advantages of the method of fabricating the first through fourth near-field light-generating elements according to the invention can be had. In addition, it is unlikely that two or more minute scattering bodies exist in one aperture. It is possible to form one minute scattering body in one aperture. Where a minute scattering body is present inside an aperture, the resolution depends more to the minute scattering body than to the aperture size. Therefore, if two or more minute scattering bodies are formed in one aperture, then the resolution will be deteriorated. However, in the present invention, it is possible to form one minute scattering body in one aperture. Therefore, the resolution of the near-field light-generating element can be prevented from deteriorating. Especially, where the size of the resist-protecting portion is equal to the sum of the size of the minute scattering body and the pitch of the periodically arranged minute scattering bodies, only the minute scattering body always exists inside the resist-protecting portion, even if the accuracy of the position for protecting the resist-protecting portion is as low as several micrometers. As a consequence, a near-field light-generating element can be fabricated with cheap fabrication equipment without the need to strictly form the position of the resist-protecting portion.

A method of fabricating a sixth near-field light-generating element according to the present invention is characterized in that said minute scattering body is gold, silver, copper, or platinum.

According to this invention, the advantages of the method of fabricating the first through fifth near-field light-generating elements according to the invention can be had. In addition, where the minute scattering body is a gold, silver, copper, or platinum, plasmons are easily produced in response to visible light. Furthermore, it is easily available and cheap.

DETAILED DESCRIPTION OF THE PREFERRED EMBODIMENTS

Devices using a near-field light-generating element and methods of fabricating the near-field light-generating element according to the present invention are hereinafter described in detail by referring to the accompanying drawings.

(Embodiment 1)

One example of a device using a near-field light-generating element where a minute scattering body is present inside an aperture is described first.

Figure 5:
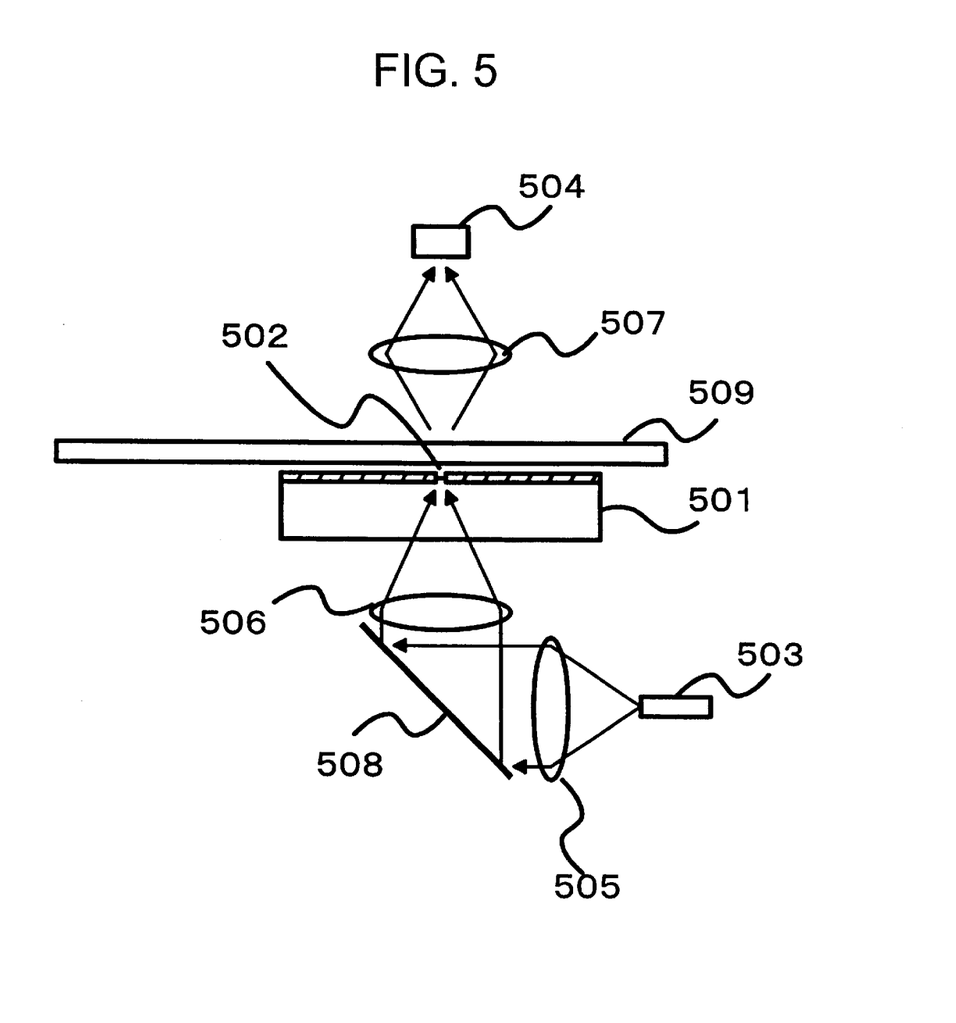
FIG. 5 is a view illustrating apparatus using a near-field light-generating element according to embodiment 1 of the present invention.
Figure 6:
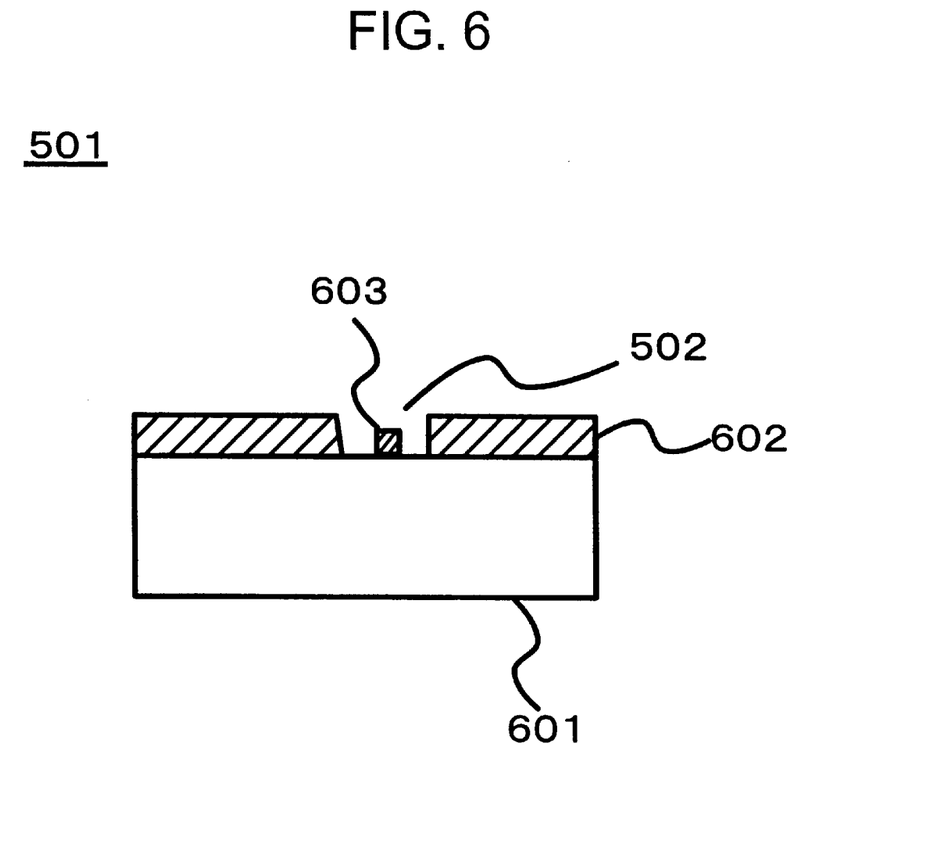
FIG. 6 is a view illustrating a near-field light-generating element according to embodiment 1 of the present invention.

FIG. 5 is a view showing one example of a device using a near-field light-generating element. FIG. 6 is a view illustrating the near-field light-generating element used in the device of FIG. 5. This device is a near-field optical microscope and used to measure optical characteristics of a microscopic region on a sample by transmission, using a planar probe.

In FIG. 6, with respect to the near-field light-generating element, 501, an aperture 502 having a diameter of 200 nm is formed in a light-shielding film 602 over a substrate 601. A minute scattering body 603 of silver is formed inside this aperture 502. The size of this minute scattering body 603 is about 50 nm. Here, visible light having a wavelength of 488 nm is used as a light source. A quartz substrate is used as the substrate 601. Here, quartz is used as the material of the substrate 601.

The operation of the near-field optical microscope using such a near-field light-generating element 501 is described.

In FIG. 5, a piezostage or the like is used as a sample 509 on the side of the near-field light-generating element 501 provided with an aperture 502. Thus, the aperture 502 and the surface of the sample 509 are brought close to each other such that the space is about tens of nanometers. Light flux exiting from a laser 503 is focused to the vicinities of the aperture 502 in the near-field light-generating element 501 through a lens 505, a mirror 508, and a lens 506. Then, near-field light is produced near the aperture 502 formed in the near-field light-generating element 501, the aperture containing a minute scattering body 603 that is a minute structure of size less than the wavelength of light. At this time, plasmons are produced near the metal minute scattering body 603 and so very strong near-field light is obtained. If this near-field light is shone onto the sample 509, the near-field light is converted into scattering light by interaction with the microscopic topography on the surface of the sample 509 or with variations in an optical constant such as refractive index. This scattering light is detected by a light-receiving element 504. This method is known as the illumination mode. This permits observation of optical information in a region that is less than the wavelength of light which has been regarded as a limit in the prior art optical system.

In this near-field light-generating element 501 where the minute scattering body 603 of a metal producing plasmons is present inside the aperture 502, the resolution is determined not by the size of the aperture 502 but by the size of the minute scattering body 603. That is, if such near-field light-generating element 501 is used, great improvement in the resolution and increase in the light intensity obtained by the detector are simultaneously accomplished. Decrease in the output of the laser and decrease in the power consumption of the device can be attained. Furthermore, optical characteristics of a microscopic region can be observed.

In addition, optical information may also be observed by shining light onto a sample to thereby produce near-field light on the sample surface and converting the near-field light into scattering light (collection mode) by interaction with the minute scattering body in the near-field light-generating element.

Here, a near-field optical microscope is used as an instrument employing a near-field light-generating element. Obviously, the near-field light-generating element according to the present invention can be used in an optical memory device for reading information recorded on a recording medium and recording information on the recording medium. Information is recorded on the recording medium by shining near-field light produced from the aperture having the minute scattering body onto the surface of the recording medium and varying the shape of a microscopic area on the recording medium (heat mode recording) or varying the refractive index or transmittance of the microscopic area (photon mode recording).

A method of fabricating a near-field light-generating element used in an instrument such as a near-field optical microscope as mentioned previously is next described.

Figure 1:
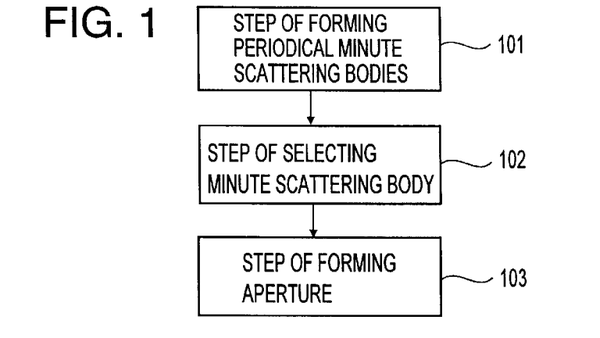
FIG. 1 is a view illustrating a method of fabricating a near-field light-generating element according to embodiment 1 of the present invention.

FIG. 1 is a view illustrating the method of fabricating the near-field light-generating element of the present invention. This figure shows only those portions which are associated with the method of fabricating a minute scattering body inside the aperture. Of course, where it is used as a near-field light-generating element in a near-field microscope or optical memory device, steps for fabricating the shape of the near-field light-generating element according to the need are necessary as well. Their description is omitted herein.

The fabrication sequence for fabricating a near-field light-generating element having a minute scattering body inside an aperture of the present invention consists of a step 101 for forming periodical minute scattering bodies placed periodically on a substrate, a step 102 for selecting only one of the periodically arranged minute scattering bodies and removing the other minute scattering bodies, and a step 103 for forming an aperture such that said one minute scattering body is placed inside the aperture. These steps are separately described in detail below.

Figure 7:
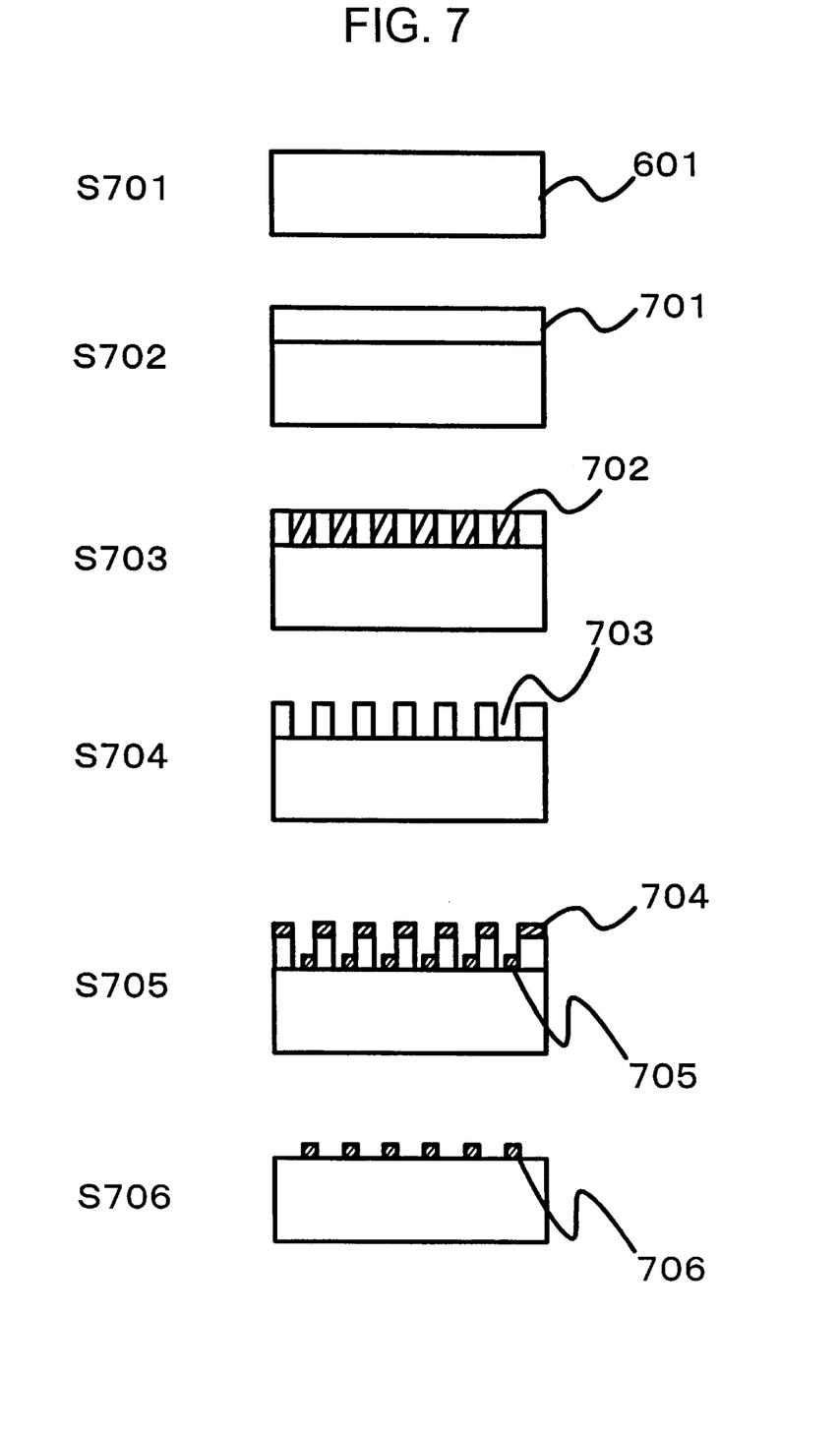
FIG. 7 is a view particularly illustrating a step of forming periodical minute scattering bodies, the step being included in the method of fabricating a near-field light-generating element according to embodiment 1 of the present invention.

FIG. 7 is a view particularly illustrating the step for forming the periodical minute scattering bodies. This step is a step for forming plural minute scattering bodies periodically on the substrate 601.

First, in step S702, a resist film 701 is formed by spin coating or other method on top of the substrate 601 of quartz, glass, or the like.

Then, in step S703, the resist film 701 is exposed, using photolithographic techniques used in normal semiconductor fabrication steps to form an exposed portion 702. The exposed portion 702 of the resist film 701 is so formed that plural squares are arranged periodically at a given pitch (in this example, 200 nm).

Then, in step S704, the exposed resist film 701 is exposed, and a resist film-removed portion 703 is formed.

Then, in step S705, silver is deposited obliquely with respect to the substrate 601 on the resist film-removed portion 703 formed on top of the substrate 601. At this time, the thickness of the deposited silver is less than tens of nanometers. It follows that silver is deposited only on a resist top metal layer 704 overlying the resist film 701 and on one corner of the square of the resist film-removed portion 703. The reason why silver is deposited on only one corner of the square of the resist film-removed portion 703 is that a part of the resist film-removed portion 703 becomes a shadow and silver is not deposited because of the thickness of the resist film 701, since formation of a film of silver atoms is attempted by oblique evaporation. As a result, silver is deposited on only one corner of the square of the resist film-removed portion 703.

In step S706, the resist film 701 is removed to thereby remove the resist film 701 and the resist top metal film 704. If minute scattering bodies 706 arranged periodically are formed by this method, the minute scattering bodies each of which has a size of a diameter of less than about 50 nm can be formed on the substrate 601.

Consequently, the minute scattering bodies 706 are formed on top of the substrate 601 in such a way that masses of silver each having a size of about 50 nm are periodically arranged at intervals of 200 nm.

Here, if electron beam exposure or the like is used for exposure of the resist film, the resist-removed portion 703 whose dimensions are less than tens of nanometers can be fabricated. In this case, such oblique evaporation is not necessary. However, with normal semiconductor techniques using a stepper or the like capable of mass production, it is difficult to form patterns of tens of nanometers. Therefore, they are fabricated by the aforementioned method.

In this example, silver atoms are used as the material of the minute scattering bodies, obviously, materials other than silver can be used as the material of the minute scattering bodies, such as metals (e.g., gold, silver, and platinum) and nonmetals which produce plasmons in response to the wavelength of the used light source). Especially, minute scattering bodies of metals such as silver, gold, platinum, and so on produce easily plasmons in response to visible radiation. Furthermore, they can be easily available and cheap.

In addition, the step of forming the periodical minute scattering bodies may use any other method as long as it forms minute scattering bodies periodically arranged on a substrate, in addition to the present method. For example, periodically arranged minute scattering bodies can be formed by using a method that makes use of highly regular, anodically oxidized porous alumina (Masuda et al., *Ohyoh Butsuri* (in Japanese), Vol. 69, No. 5, p. 558 (2000)).

Then, the step of selecting the minute scattering bodies is described.

Figure 2:
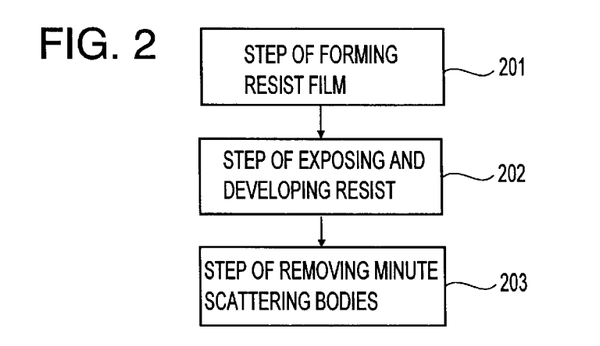
FIG. 2 is a view illustrating a step of selecting a minute scattering body, the step being included in the method of fabricating a near-field light-generating element according to embodiment 1 of the present invention.

FIG. 2 is a view illustrating the step of selecting the minute scattering bodies, the step being included in the method of fabricating a near-field light-generating element according to embodiment 1 of the present invention.

The step of selecting the minute scattering bodies consists of the step 201 of forming a resist film over the plural, periodically arranged minute scattering bodies on the substrate formed by the step of forming the periodical minute scattering bodies, the step 202 of exposing and developing the resist film, and the step 203 of removing the minute scattering bodies except for one minute scattering body, using the resist-protecting portion formed by the step of forming the exposing and developing the resist.

Figure 8:
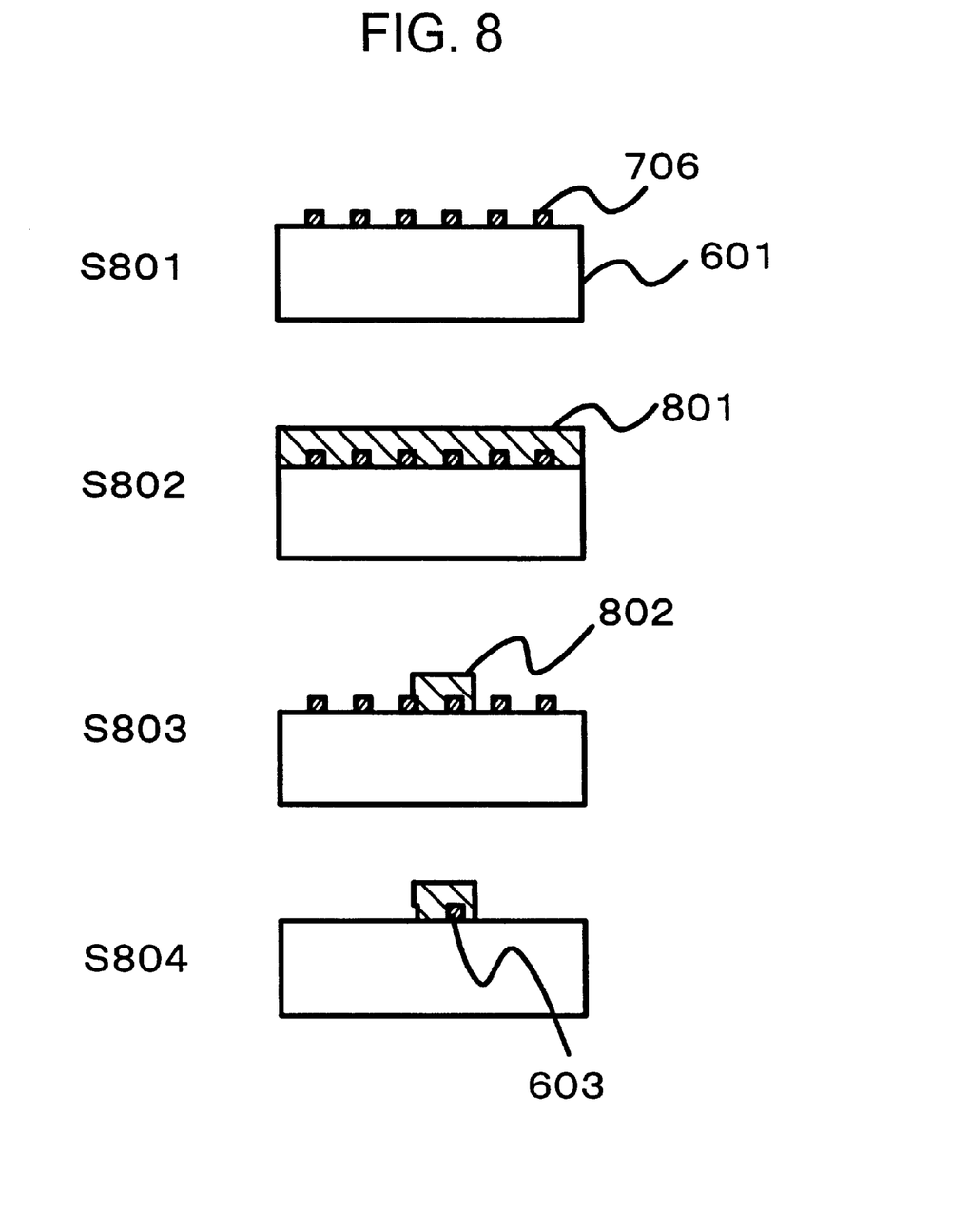
FIG. 8 is a view particularly illustrating a step of selecting a minute scattering body, the step being included in a method of fabricating a near-field light-generating element according to embodiment 1 of the present invention.

FIG. 8 is a view particularly illustrating the step of selecting the minute scattering body, the step being included in the method of fabricating a near-field light-generating element according to embodiment 1 of the present invention. The step of selecting the minute scattering body is hereinafter described by referring to FIG. 8.

First, as the step of forming the resist film, a resist film 801 is formed by spin coating or other method on top of the substrate formed by the step of forming the periodical minute scattering bodies (step S802). At this time, the resist film 801 is so formed as to cover all the minute scattering bodies 706 arranged periodically on the substrate 601.

Then, as the step of exposing and developing the resist, the resist film 801 is exposed and developed in step S803 to form a resist-protecting portion 802. The size of the resist-protecting portion 802 needs to be large enough that one minute scattering body exists inside the resist-protecting portion 802. In particular, the size of the resist-protecting portion 802 needs to be greater than the size of the minute scattering body and less than the sum of the size of the minute scattering body and the pitch of periodically arranged minute scattering bodies. Here, the resist-protecting portion 802 is a square whose each one side is 250 nm. Of course, shapes other than a square may be possible. Note that care needs to be paid to the arrangement of the minute scattering bodies and to the shape of the resist-protecting portion. That is, care should be taken such that one of periodically arranged minute scattering bodies exists within the formed resist-protecting film.

Then, as the step of removing minute scattering bodies, the periodically arranged, minute scattering bodies 706 formed on the substrate 601 are etched, using the resist-protecting portion 802 (step S804). Then, the minute scattering bodies other than the minute scattering body 603 present inside the resist-protecting portion 802 are removed from on top of the substrate 601. Even where the minute scattering bodies are partially covered with the resist-protecting portion 802, such minute scattering bodies are also removed by performing etching sufficiently. Consequently, only the minute scattering body 603 existing inside the resist-protecting portion 802 is formed on the substrate 601.

It is now assumed that the size of the resist-protecting portion is the sum of the size of the minute scattering body and the pitch of the periodically arranged minute scattering bodies. The accuracy of the position of the resist-protecting portion can be very low. That is, the purpose of this step is to create such a state that one minute scattering body exists inside the resist-protecting portion. Therefore, any one of the periodically arranged minute scattering bodies is left behind; the others are removed. In consequence, the size and shape of the resist-protecting portion need be accurate, but the positional accuracy can be considerably low.

In normal semiconductor processes using masks, it is easy to control the size of the resist-protecting portion. However, it is very difficult to set the mask position alignment accuracy to less than tens of nanometers in order to strictly control the position of the resist-protecting portion. Therefore, use of the aforementioned method facilitates forming the resist-protecting portion having only one minute scattering body therein.

Where the size of the resist-protecting portion is less than the size of each minute scattering body or greater than the sum of the size of the minute scattering body and the pitch of the periodically arranged minute scattering bodies, no minute scattering body exists inside the resist-protecting portion in the former case and two or more minute scattering bodies exist at all times inside the resist-protecting portion in the latter case, thus presenting a problem.

Finally, the step of forming the aperture is described.

Figure 3:
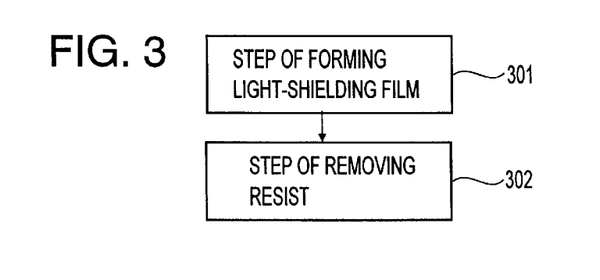
FIG. 3 is a view illustrating a step of forming an aperture, the step being included in the method of fabricating a near-field light-generating element according to embodiment 1 of the present invention.

FIG. 3 is a view illustrating the step of forming the aperture, the step being included in the method of fabricating a near-field light-generating element according to embodiment 1 of the present invention.

The step of forming the aperture consists of a step 301 of forming a light-shielding film on the side of the substrate on which minute scattering bodies are formed and a step 302 of removing the resist-protecting portion to thereby form the aperture.

Figure 9:
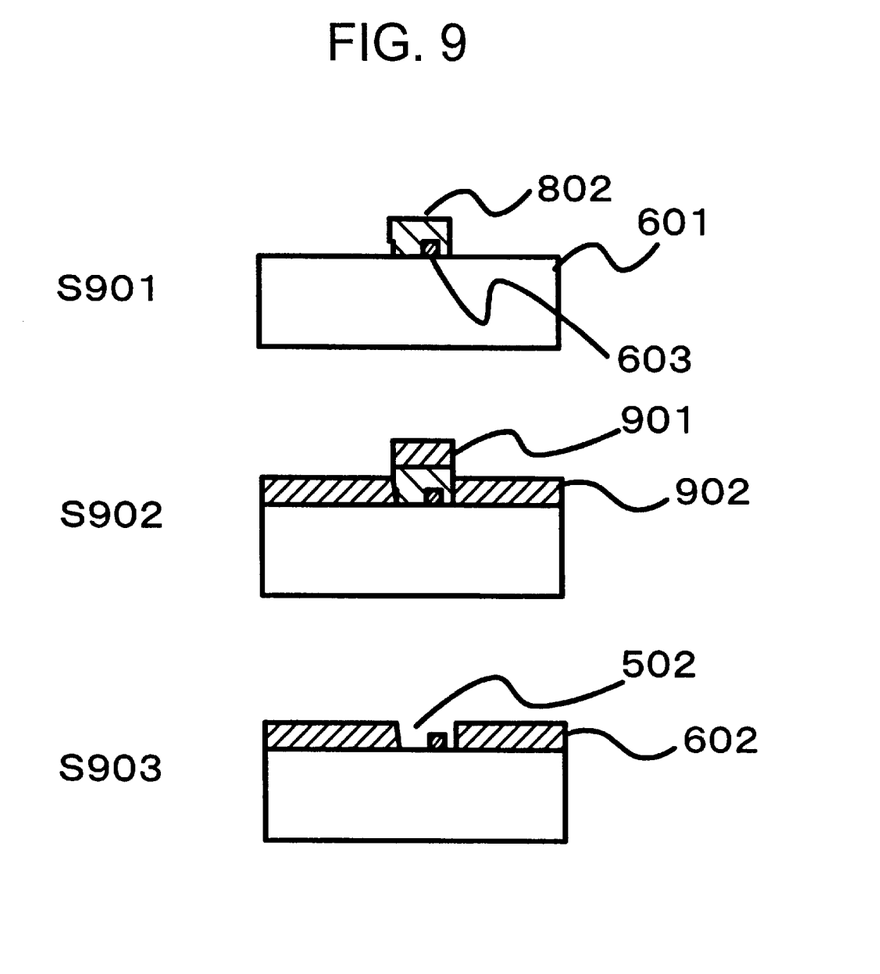
FIG. 9 is a view particularly illustrating a step of forming an aperture, the step being included in a method of fabricating a near-field light-generating element according to embodiment 1 of the present invention.

FIG. 9 is a view particularly illustrating the step of forming the aperture, the step being included in the method of fabricating a near-field light-generating element according to embodiment 1 of the present invention. The step of forming the aperture is hereinafter described by referring to FIG. 9.

First, in step S902, as the step of forming the light-shielding film, Al is deposited as the light-shielding film on top of the substrate formed by the step of removing the minute scattering bodies by sputtering, vacuum evaporation, or other method. As a result, a resist top light-shielding film 901 and a light-shielding film 902 are formed on top of the resist-protecting film 802 and the substrate 601, respectively. In the present embodiment, Al is used. The material of this light-shielding film is not limited to metals such as Al and Cu. Obviously, any material may be used as long as it has sufficient light-shielding coefficient for the used light source.

Then, as the step of removing the resist, the resist-protecting portion 802 is removed in step S903. The resist top light-shielding film 901 formed on top of the resist-protecting portion 802 is removed together with the resist-protecting portion 802. Therefore, the substantially square aperture 502 whose each one side is 200 nm and which is substantially equal in size with the resist-protecting film 802 is formed on the Al light-shielding film 602 formed on top of the substrate 601. Therefore, a near-field light-generating element where a minute scattering body 603 of silver having a diameter of 50 nm is formed inside the aperture 502 can be fabricated. If necessary, a transparent protective film is finally formed on top of the minute scattering body 603 inside the aperture 502 and the light-shielding film 602.

Therefore, the resist-protecting film can be used intact as a mask for forming an aperture. This makes it unnecessary to form a mask for forming an aperture or to form an aperture by FIB processing. In addition, a minute scattering body is always formed inside the aperture without the necessity of strict alignment or complex fabrication processes. In consequence, the cost of the near-field light-generating element can be reduced further.

In the present embodiment, quartz, glass, or the like that is transparent to visible light is used as the substrate. This substrate is only required to show a sufficient transmittance for the wavelength of the used light source. Of course, materials other than quartz and glass can be used.

Where a substrate (e.g., a Si substrate for visible light) showing a low transmittance for the wavelength of the used light source is used, a space is formed in a part of the substrate or a material of high transmittance is buried such that light flux from the light source impinges on the vicinities of the aperture. In this way, a near-field light-generating element can be fabricated by a similar method.

Furthermore, the region where the periodical minute scattering bodies are arranged depends on the positional accuracy when the resist-protecting portion is fabricated. That is, in a process for fabricating the resist-protecting portion, it is necessary to form the periodical minute scattering bodies in a region wider than the positional accuracy when the resist-protecting portion is formed on the substrate, taking account of the mask alignment accuracy, the stage accuracy, and so on. For example, where the capability of the present semiconductor process is taken into consideration, it suffices to fabricate periodical minute scattering bodies in a region of about 10 $\mu$m×10 $\mu$m.

Furthermore, the arrangement of the periodical minute scattering bodies can be either a one-dimensional, linear arrangement or a two-dimensional arrangement, as long as it is a periodical arrangement.

In the present embodiment, the step of forming one aperture in which a minute scattering body exists on one substrate has been described. Plural apertures can be formed in one substrate concurrently. Of course, it is also possible to fabricate plural near-field light-generating elements on one substrate simultaneously. Where a plurality of near-field light-generating elements are manufactured on one substrate, the individual near-field light-generating elements need to be diced separately by dicing or other method, if necessary.

Therefore, as described thus far, in the method of fabricating a near-field light-generating element according to the present embodiment, periodically arranged minute scattering bodies are formed on a substrate by the step of forming periodical minute scattering bodies. Then, all the minute scattering bodies arranged periodically except for only one minute scattering body are removed by the step of selecting a minute scattering body. Finally, an aperture having one minute scattering body therein is formed. Thus, a near-field light-generating element having the minute scattering body therein can be fabricated. In addition, with respect to the resist-protecting portion for selecting only one minute scattering body from the periodically arranged minute scattering bodies, its size and shape need accuracy. However, its position does not need high accuracy. In normal semiconductor processes, it is easy to fabricate the shape of the resist-protecting portion at high accuracy, but it is very difficult to control the position in units of tens of nanometers. It has been impossible to form a minute scattering body inside an aperture with the conventional method.

However, according to the method of fabricating a near-field light-generating element according to the present embodiment, the shape accuracy is high. The positional accuracy can be relatively low. Today's normal semiconductor processes can be utilized intact. Therefore, mass production of high-performance, near-field light-generating elements using plasmons is enabled. Furthermore, lower costs can be easily achieved. Moreover, where a near-field light-generating element fabricated by the method of the present invention is applied to a near-field optical microscope or to an optical memory device, the same semiconductor processes can be used as processes for fabricating necessary shapes. Hence, the process affinity is very high.

In the past, an expensive superaccurate positioning mechanism has been indispensable while observing with SEM or the like in selecting one minute scattering body from a plurality of minute scattering bodies. The present invention makes it unnecessary to use an expensive superaccurate positioning mechanism while making such an observation. Fabrication equipment used in normal semiconductor processes and having no special and expensive positioning mechanism can be employed. In addition, if the region where plural periodical minute scattering bodies are fabricated is widened, less stringent requirement is imposed on the positional accuracy in forming the resist-protecting portion. Near-field light-generating elements can be manufactured with fabrication equipment having a cheap positioning mechanism. Therefore, the cost of the near-field optical head can be reduced further.

In addition, according to the fabrication method according to the present embodiment, two or more minute scattering bodies do not exist inside the resist-protecting portion. It is possible to form one minute scattering body in one aperture. Where a minute scattering body exists inside an aperture, the resolution is associated more with the minute scattering body than the aperture size. Therefore, if two or more minute scattering bodies are formed within one aperture, the resolution will be deteriorated. However, in the present method, one minute scattering body can be formed inside one aperture. Consequently, decrease in the resolution of the near-field light-generating element can be prevented.

Especially, where the size of the resist-protecting portion is equal to the sum of the size of the minute scattering body, and the pitch of the periodically arranged minute scattering bodies, if the accuracy of the position where the resist-protecting portion is formed is quite low, i.e., on the micrometer order, one minute scattering body always exists inside the resist-protecting portion. Therefore, it is not necessary to strictly form the position of the resist-protecting portion. In some cases, the aligning mechanism itself for fabricating the resist-protecting portion is dispensed with. Near-field light-generating elements can be fabricated with cheaper fabrication equipment.

Moreover, apparatus using a near-field light-generating element by the method of the present embodiment can achieve cost reduction. Because the near-field light-generating element makes use of plasmon effects, the efficiency of utilization of light can be improved immensely. Lower power consumption and miniaturization of the apparatus can be attained.

(Embodiment 2)

Figure 4:
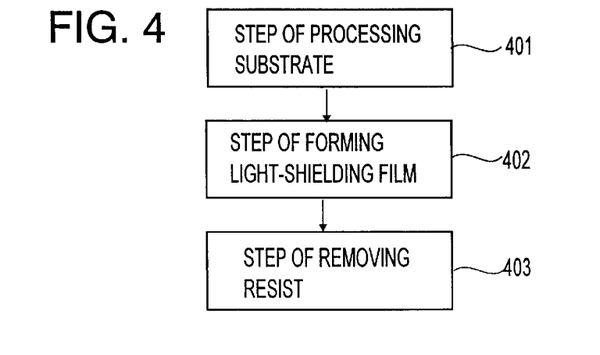
FIG. 4 is a view illustrating another step of forming an aperture, the step being included in a method of fabricating a near-field light-generating element according to embodiment 2 of the present invention.

FIG. 4 shows a view illustrating a method of fabricating a near-field light-generating element according to embodiment 2 of the present invention. FIG. 4 is another method of aperture-forming step in embodiment 1. The other steps are identical with those of embodiment 1. Therefore, description of the step of forming periodic minute scattering bodies and the step of selecting a minute scattering body is omitted. Furthermore, description of the other steps is partly omitted or simplified.

The step of forming an aperture, the step being included in the method of fabricating a near-field light-generating element according to the present embodiment 2 consists of a step 401 of processing a substrate to thin a part of the substrate using the resist-protecting portion, a step 301 of forming a light-shielding film on the side of the substrate on which minute scattering bodies are formed, and a step 302 of removing the resist-protecting portion to thereby form the aperture.

Figure 10:
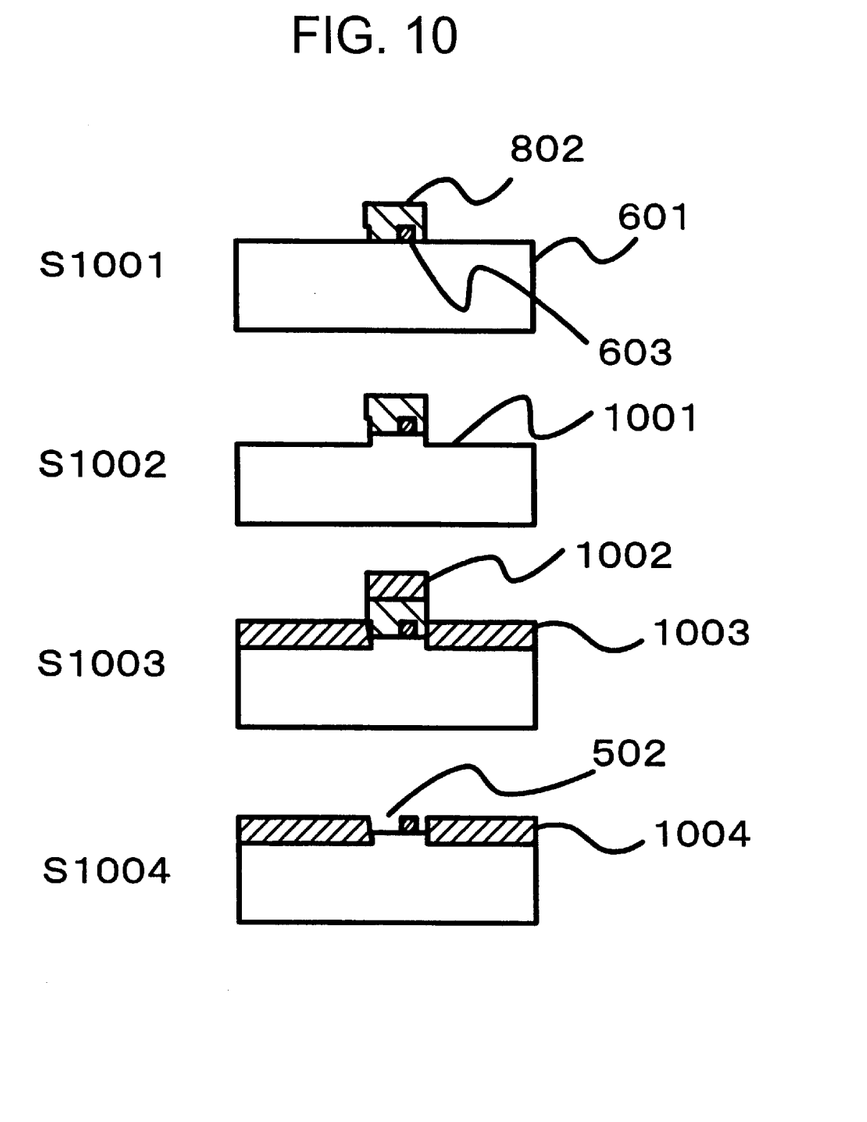
FIG. 10 is a view particularly illustrating another step of forming an aperture, the step being included in a method of fabricating a near-field light-generating element according to embodiment 2 of the present invention.

FIG. 10 is a view particularly illustrating another aperture-forming step according to the present invention.

In step S1001, one minute scattering body 603 formed on top of a substrate 601 fabricated by the step of forming periodical minute scattering bodies and the step of selecting a minute scattering body is shown, as well as a resist-protecting portion 802 having a minute scattering body 603 therein.

Then, as the step of processing the substrate, a part of the substrate 601 is etched using the resist-protecting portion 802 as a mask in step S1002, thus thinning the substrate.

Then, as the step of forming a light-shielding film, an Al light-shielding film 1003 and a resist top light-shielding film 1002 are formed on top of the etched substrate 601 by a method similar to the method described in embodiment 1 in step S1003.

Finally, as the step of removing the resist, the resist-protecting portion 802 and the resist top light-shielding film 1002 are removed by a method similar to the method described in embodiment 1 in step S1004.

The amount by which the substrate 601 is etched in step S1003 is about equal to the amount obtained by subtracting the size of the minute scattering body 603 from the thickness of the subsequently formed light-shielding film 1003. That is, the light-shielding film 1003 and the minute scattering body 603 are made substantially equal in height.

Therefore, a near-field light-generating element characterized as follows can be fabricated. A square aperture 502 whose each one side is about 200 nm and which is similar in shape with the resist-protecting portion is formed in a light-shielding film 1004 of Al formed on top of the substrate 601. A minute scattering body 603 of silver of 50 nm is formed inside the aperture 502. Furthermore, the light-shielding film 1004 and the minute scattering body 603 are equal in height.

Accordingly, as described thus far, in the aperture-forming step of the method of fabricating a near-field light-generating element according to the present embodiment, a part of the substrate is thinned using the resist-protecting portion as a mask by the step of processing the substrate. Then, the light-shielding film is formed on the side of the substrate on which the minute scattering body is formed by the step of forming the light-shielding step. Finally, the resist-protecting portion is removed by the resist-removing step, thus forming the aperture. In this way, a near-field light-generating element having an aperture containing a minute scattering body therein is fabricated.

The advantages described in embodiment 1 can be had. In addition, the substrate can be etched without specially forming a mask. The factors leading to cost increases can be removed maximally. A near-field light-generating element can be fabricated at low cost.

Additionally, a near-field light-generating element in which the light-shielding film 1004 and the minute scattering body 603 are equal in height can be readily fabricated. If such a near-field light-generating element is used, the distance between a sample and the minute scattering body where plasmons are produced can be reduced. The intensity of scattering light produced as a result of interaction between the sample surface and the minute scattering body can be increased greatly. The efficiency of utilization of light is improved further. Moreover, the distance between the sample and the minute scattering body is very small and so the resolution is improved. According to the method of fabricating a near-field light-generating element according to the present embodiment, the near-field light-generating element having such features can be fabricated easily and at low cost.

As described thus far, according to the method of fabricating a near-field light-generating element of the present invention, a near-field light-generating element having a minute scattering body inside an aperture can be easily fabricated, the scattering body producing plasmons. The fabrication process itself for near-field light-generating elements of the present invention can be a normal semiconductor process. Mass production of high-performance near-field light-generating elements utilizing plasmon effects is enabled. Furthermore, lower costs can be easily accomplished. In addition, a process for forming shapes other than the aperture in a near-field light-generating element necessary to apply the present near-field light-generating element to a near-field optical microscope or to an optical memory device can be the same semiconductor process. Therefore, the process affinity between the step of forming the aperture and the step of forming the shapes of other portions is very high.

Moreover, the efficiency of utilization of light can be improved immensely by using a near-field light-generating element fabricated by the fabrication method of the present invention in a microscope or optical information record/read apparatus, the light-generating element producing plasmons. The power consumption of the apparatus can be reduced. The size of the apparatus can be reduced.

Further, in selecting one minute scattering body out of plural minute scattering bodies, fabrication equipment used in normal semiconductor processes having no special and expensive alignment mechanism can be employed. Near-field light-generating elements can be fabricated by fabrication equipment having a cheap alignment mechanism. Therefore, the cost of the near-field optical head can be reduced further.

In addition, one minute scattering body can be formed in one aperture by setting the size of the resist-protecting portion greater than the size of the minute scattering body and less than the sum of the diameter of the minute scattering body described above and the pitch of periodically arranged minute scattering bodies. Where a minute scattering body exists inside an aperture, the resolution is associated more with the size of the minute scattering body than the size of the aperture. Therefore, if two or more minute scattering bodies are formed in one aperture, the resolution will cause a deterioration of the resolution. In the present method, however, one minute scattering body can be formed inside one aperture. Therefore, the resolution of the near-field light-generating element can be prevented from deteriorating. Especially, where the size of the resist-protecting portion is equal to the sum of the size of the minute scattering body and the pitch of periodically arranged minute scattering bodies, it is not necessary to strictly control the position of the resist-protecting portion. In some cases, an alignment mechanism itself for fabricating the resist-protecting portion is not necessary. Near-field light-generating elements can be fabricated with cheap fabrication equipment.

Furthermore, the resist-protecting portion can be used intact as a mask for forming an aperture. Therefore, it is not necessary to fabricate a mask for forming the aperture. It is also not necessary to form the aperture by FIB processing. In addition, a minute scattering body is always formed inside the aperture without the need to perform a strict alignment or complex fabrication process. Consequently, the cost of the near-field light-generating element can be reduced further.

In addition, where the minute scattering body is gold, silver, copper, or platinum, plasmons are easily produced in response to visible light. Furthermore, it can be easily available and cheap.

Further, if the aperture formation step as described in embodiment 2 is used, the substrate can be etched without specially forming a mask for etching the substrate. This leads to a further decrease in the cost. Since the light-shielding film and the minute scattering body are equal in height, the distance between the sample and the minute scattering body can be made short. The intensity of scattering light produced as a result of interaction between the sample surface and the minute scattering body can be increased greatly. This further enhances the efficiency of utilization of light. Moreover, the resolution improves, since the distance between the sample and the minute scattering body is very short.

What is claimed is:

1. A method of fabricating a near-field light-generating element having a minute scattering body inside an aperture, the scattering body producing plasmons by being illuminated with light, said method comprising the steps of:

forming minute scattering bodies placed periodically on a substrate;

selecting only one of the minute scattering bodies placed periodically and removing the other minute scattering bodies; and forming said aperture such that said one minute scattering body is placed inside said aperture.

2. A method of fabricating a near-field light-generating element as set forth in claim 1, wherein said step of selecting only one of the minute scattering bodies includes the steps of:

forming a resist film so as to cover at least said minute scattering bodies placed periodically;

exposing and developing said resist film; and leaving said one minute scattering body and removing the other minute scattering bodies, using a resist-protecting portion formed by said step of exposing and developing said resist.

3. A method of fabricating a near-field light-generating element as set forth in claim 2, wherein said step of forming the aperture includes the steps of:

forming a light-shielding film on the side of said substrate on which said minute scattering bodies are formed; and forming the aperture by removing said resist-protecting portion.

4. A method of fabricating a near-field light-generating element as set forth in claim 3, wherein the size of said resist-protecting film is in excess of the size of said minute scattering body and smaller than the sum of the size of said minute scattering body and the pitch of said minute scattering bodies placed periodically.

5. A method of fabricating a near-field light-generating element as set forth in claim 4, wherein said minute scattering body is made of gold, silver, copper, or platinum.

6. A method of fabricating a near-field light-generating element as set forth in claim 3, wherein said minute scattering body is made of gold, silver, copper, or platinum.

7. A method of fabricating a near-field light-generating element as set forth in claim 2, wherein said step of forming the aperture includes the steps of:

processing the substrate by thinning parts of said substrate using said resist-protecting portion;

forming a light-shielding film on the side of said substrate on which said minute scattering bodies are formed; and forming the aperture by removing said resist-protecting portion.

8. A method of fabricating a near-field light-generating element as set forth in claim 7, wherein the size of said resist-protecting film is in excess of the size of said minute scattering body and smaller than the sum of the size of said minute scattering body and the pitch of said minute scattering bodies placed periodically.

9. A method of fabricating a near-field light-generating element as set forth in claim 8, wherein said minute scattering body is made of gold, silver, copper, or platinum.

10. A method of fabricating a near-field light-generating element as set forth in claim 7, wherein said minute scattering body is made of gold, silver, copper, or platinum.

11. A method of fabricating a near-field light-generating element as set forth in claim 2, wherein the size of said resist-protecting film is in excess of the size of said minute scattering body and smaller than the sum of the size of said minute scattering body and the pitch of said minute scattering bodies placed periodically.

12. A method of fabricating a near-field light-generating element as set forth in claim 11, wherein said minute scattering body is made of gold, silver, copper, or platinum.

13. A method of fabricating a near-field light-generating element as set forth in claim 2, wherein said minute scattering body is made of gold, silver, copper, or platinum.

14. A method of fabricating a near-field light-generating element as set forth in claim 1, wherein said minute scattering body is made of gold, silver, copper, or platinum.

* * * * *